United States Patent [19]
Searby

[11] Patent Number: 5,864,646
[45] Date of Patent: Jan. 26, 1999

[54] VIDEO SIGNAL CODING OF PLURAL RELATED FRAME SEQUENCES FOR SELECTIVE REPLAY

[75] Inventor: Stephen Searby, Woodbridge, England

[73] Assignee: British Telecommunications public limited company, London, England

[21] Appl. No.: 886,924

[22] Filed: Jul. 2, 1997

Related U.S. Application Data

[63] Continuation of Ser. No. 242,105, May 13, 1994, abandoned.

[30]     Foreign Application Priority Data

Mar. 23, 1994 [EP]  European Pat. Off. .............. 94302102

[51] Int. Cl.$^6$ ................................................... H04N 5/783
[52] U.S. Cl. .............................. 386/68; 386/82; 386/111; 386/125
[58] Field of Search ................................ 386/6–8, 33, 40, 386/68–70, 81–82, 109, 111, 112, 124–126; 360/72.1, 72.2; H04N 5/76, 5/78, 5/781, 5/783, 5/92, 9/79

[56]                References Cited

U.S. PATENT DOCUMENTS

| | | | |
|---|---|---|---|
| 4,931,879 | 6/1990 | Koga et al. ............................. | 358/335 |
| 5,133,079 | 7/1992 | Ballantyne et al. . | |
| 5,140,437 | 8/1992 | Yonemitsu et al. ..................... | 358/342 |
| 5,282,049 | 1/1994 | Hatakenaka et al. ................... | 386/111 |
| 5,337,199 | 8/1994 | Arai et al. ................................ | 386/68 |
| 5,461,486 | 10/1995 | Uchida .................................... | 386/112 |
| 5,543,932 | 8/1996 | Chang et al. ........................... | 386/111 |
| 5,576,902 | 11/1996 | Lane et al. ............................... | 386/86 |
| 5,587,805 | 12/1996 | Park ......................................... | 386/68 |

FOREIGN PATENT DOCUMENTS

| | | |
|---|---|---|
| 0327931 | 8/1989 | European Pat. Off. . |
| 0558306 | 9/1993 | European Pat. Off. ........ G11B 27/28 |
| 0366272 | 3/1991 | Japan ............................... H04N 5/92 |
| WO 92/05504 | 9/1991 | WIPO . |

OTHER PUBLICATIONS

JP-A-3066272 (Matsushita Electric Ind. Co. Ltd.) 20 Mar. 1991 & Patent Abstracts of Japan, vol. 15, No. 229 (E–1076) 11 Jun. 1991.

Patent Abstracts of Japan, vol. 15, No. 261 (E–1085) 3 Jul. 1991 & JP-A-03085974 (Fujitsu Ltd) 11 Apr. 1991.

*Primary Examiner*—Tha Tran
*Attorney, Agent, or Firm*—Nixon & Vanderhye P.C.

[57]                ABSTRACT

A method of coding a moving picture comprising generating a first sequence of digital signals representing a set of images of a moving picture and at least one further sequence of digital signals representing a further set of images of the moving picture and writing the sequences onto a data carrier. The or each further set of images may be a subset of the first set. An interactive video system can access and transmit a sequence as requested by a consumer without further processing of the digital signals.

9 Claims, 2 Drawing Sheets

VIDEO SIGNAL CODING OF PLURAL RELATED FRAME SEQUENCES FOR SELECTIVE REPLAY

This is a continuation of application Ser. No. 08/242,105, filed May 13, 1994, now abandoned.

BACKGROUND OF THE INVENTION

1. Field of the Invention

This invention relates to the coding of video signals and in particular the coding of video signals for storage and subsequent transmission.

2. Related Art

Broadcast quality television signals require around 6 MHz of analogue bandwidth or in excess of 100 Mbit/s of information for a digital format obtained by sequentially sampling an analogue signal to produce a PCM digital signal.

Such high bit rate signals are expensive to transmit and for transmission cost reasons therefore it is desirable to reduce the amount of information required. This can be done by taking advantage of the correlation between neighbouring elements of a picture (pixels) and thus compromising between the reduction in information and the quality of the picture.

Redundancy reduction techniques assume there is some correlation between neighbouring pixels, either in space and/or in time. For instance, in an area of a scene which is relatively uniform (for instance a wall of a room), the pixel values of neighbouring pixels within this area are likely to be fairly close. Similarly, in a fairly static scene, the pixels of one frame will correspond closely to the equivalent pixels of a previous frame.

Hence pixels of a single frame can be coded with respect to their relationship to each other (intraframe coding) and/or with respect to their relationship with pixels of neighbouring frames (interframe coding). Intraframe coded frames (intrapictures) can clearly be decoded without reference to any other frame whilst interframe coded frames (interframes) require information relating to the frames used in the prediction. Differential coding techniques may also be used to compress video signals further. Since interframe differential coding may result in the irretrievable loss of some information owing to transmission errors, artifacts will occur in a decoded picture if only interframe differential coding is used. It is thus usual for a combination of intra- and inter-frame coding techniques to be used, the intraframes restoring the integrity of the decoded signal.

Other compression techniques can also be employed; for instance transform coding which seeks to exploit the correlation of pixel magnitudes within a frame by finding another set of coefficients, the magnitude of many of which will be relatively small. These coefficients can then be quantised coarsely or omitted altogether. The transform coefficients of a frame can thus be coded using less information. One popular form of transform coding uses the discrete cosine transform (DCT).

Another form of interframe compression technique is motion compensation coding which involves the identification of areas in successive frames which appear to correspond but have moved within the frame. A motion vector is calculated for each such area and a predicted frame is then formed from the previous frame and the motion vectors. Errors between the predicted frame and the actual frame are then calculated and, together with the motion vectors, coded. This may result in less information than that of two frames taken together.

The compression of video signals is the subject of much standardisation work. One such standard is the ISO-IEC 11172 standard "Coding of moving pictures and audio for digital storage media at up to about 1.5 Mbit/s", known as MPEG-1, which relates to the storage of video and associated audio on digital storage media such as CD-ROM, digital audio tape (DAT), tape drives, writable optical drives or for transmission over telecommunication channels such as an integrated services digital network (ISDN) and local area networks. Such coding techniques are attractive for the provision of audiovisual services over limited bandwidth systems.

The time taken to access and retrieve a stored video signal can be prohibitive to the provision of interactive video services in which a consumer selects a particular service from a range of available services. The access time is increased dramatically if the stored video signal requires further processing before it can be output to a display device.

A recent development in such services is the provision of home entertainment or shopping services in which a consumer selects a service from a range on offer and the relevant video signal is transmitted to the consumer's premises from a central server. In a video-on-demand environment, for example, a consumer uses a central video server in the manner of a remote video cassette player. Consumers therefore expect the same facilities as they would have on their own video cassette player e.g. the facility to play, pause, stop, fast forward and reverse.

Various processors are available which provide these facilities. When a consumer requests play, the coded video signal stored at the remote server is transmitted to the consumer. A local decoder at the consumer's premises decodes the incoming signal to produce a video image on a television set. In the pause mode, a pause signal is sent to the server which, in response, sends a signal to the consumer's decoder indicating that the frame is unchanged.

When fast forward or reverse is selected however, the coded signal must be processed further by the video server. When a consumer requests fast forward, a signal is sent to the server which then transmits every, say, fourth frame of the coded signal. If the video signal is in an uncompressed format, the server has to locate the beginning of every fourth frame in the video signal and transmit these to the consumer. This is very processor and time intensive and may result in a delay that would be unacceptable to consumers.

Similarly, if compression coding techniques have been employed, the fifth frame of the picture may have been coded with reference to the fourth frame. If in the fast forward mode only the first, fifth, ninth etc. frames are to be sent, each frame to be sent must be recoded with respect to the preceding frame to be sent. This is very processor- and time-intensive. For video signals coded using only intraframe coding, it is known to provide a fast forward mode by extracting the intraframe coded frames (intrapictures) from the encoded video signal and transmitting these frames in their original order. Similarly they could be sent in the reverse order for the fast reverse mode. However, not only does the server, on receiving a fast forward request signal, have to search the coded signal for intrapictures but the bit rate of the resulting signal will be increased as compared to the play mode since the intrapictures include very little compression. The decoder at the consumer's premises therefore has to be able to manage excessive changes in the bit rate.

SUMMARY OF THE INVENTION

In accordance with the invention a method of coding a moving picture comprises generating a first sequence of digital signals representing a set of images of the moving picture and at least one further sequence of digital signals representing a further set of images of the moving picture.

It will be appreciated that the generated sequences of digital signals will have an increased storage requirement compared to a sequence which represents a play mode. However, the coded sequences of data can be played back without any further processing of the data. In addition, since the sequences are coded using the same coding means, the average bit rate of the sequences will be the same. A decoder for decoding the sequences can therefore be simplified as compared to known decoders since the decoder does not need to include means for managing excessive changes in bit rate.

The sequences may be generated using any suitable coding techniques such as PCM or compression coding. A combination of intraframe, interframe, differential, DCT and motion compensation techniques may be used. Preferably a technique that conforms to IS 11172 or CCITT Recommendation H.261 is employed.

The sequences preferably represent a play mode and any combination of a reverse play mode, a fast forward mode or a fast reverse mode, the further set of images in the latter two cases being a subset of the first set of images. Any suitable number of playback modes may be provided; for example two fast forward modes may be coded, one at three times the speed of the normal play mode and another at six times the speed of the play mode.

The sequences may be generated by interframe differential coding. Preferably, the first sequence is generated by comparing, at each input of a new frame of the moving picture, a current frame of the moving picture with a frame immediately preceding the current frame and a further sequence is generated by comparing, at the input of every nth frame of the moving picture, the current frame with the preceding such frame, where n is an integer greater than 1.

The invention also provides a data carrier having recorded thereon a first sequence of digital signals representing a set of images of a moving picture and at least one further sequence of digital signals representing a further set of images of the moving picture.

Preferably the or each further set of images is a subset of the first set. The subset may represent a fast forward playback mode and/or a fast reverse playback mode.

The data carrier may take any suitable form, for instance CD-ROM, DAT, tape drives or writable optical drives. For a typical fast forward or fast reverse sequence to run at 6 times the play speed, an extra storage capacity of 16% would be required compared to the storage capacity required for a sequence corresponding to the play mode only.

There is also provided according to the invention a video replay apparatus comprising switching means for switching between a first sequential file and a second sequential file of a record medium, a position counter for recording the current position on a sequential file being played and means, responsive to the position counter and to information stored on the record medium, to determine a corresponding position on the other sequential file.

Preferably the determining means, responsive to information stored on the record medium relating to the lengths of the sequential files, calculates the proportion of the length of the file being played that is represented by the current position in said file and calculates the position in the said other file that corresponds to the same proportion of the length of the other file. Thus if the file being played represents a play mode of a moving picture and the current position is 25% through the sequential file, the corresponding position in a second sequential file representing a fast forward mode, is 25% through the second file.

Similarly, if the first file represents a play mode of a moving picture and the second file represents a reverse mode, the corresponding position in the reverse mode can be determined by calculating the remaining proportion of the length of the file being played and calculating the position in the said other file that corresponds to the remaining proportion of the file being played. Hence if the player is 75% of the way through the first file, the corresponding position is 25% of the way through the second file.

The video replay apparatus may be used in an interactive video system in which the record medium is accessed in response to a signal from a remote consumer and a relevant sequence is output for reception by a decoder at the consumer's premises.

According to a further aspect of the invention a video coder comprises a preprocessor for selecting frames of a video signal, coding means for generating a first sequence of digital signals representing a set of images of a moving picture and at least one further sequence of digital signals representing a further set of images of the moving picture, and means for writing the sequences onto a data carrier.

The or each further set of images may be a subset of the first set, so representing fast forward or fast reverse playback modes of the moving picture. The coder is preferably operable to encode every frame of a moving picture and also operable to encode every nth frame of the moving picture, where n is an integer greater than 1.

Preferably the coding means includes interframe differential coding means.

BRIEF DESCRIPTION OF THE DRAWINGS

The invention will now be described further by way of example only with reference to the accompanying drawings in which.

DETAILED DESCRIPTION OF EXEMPLARY EMBODIMENTS

Figure 1:
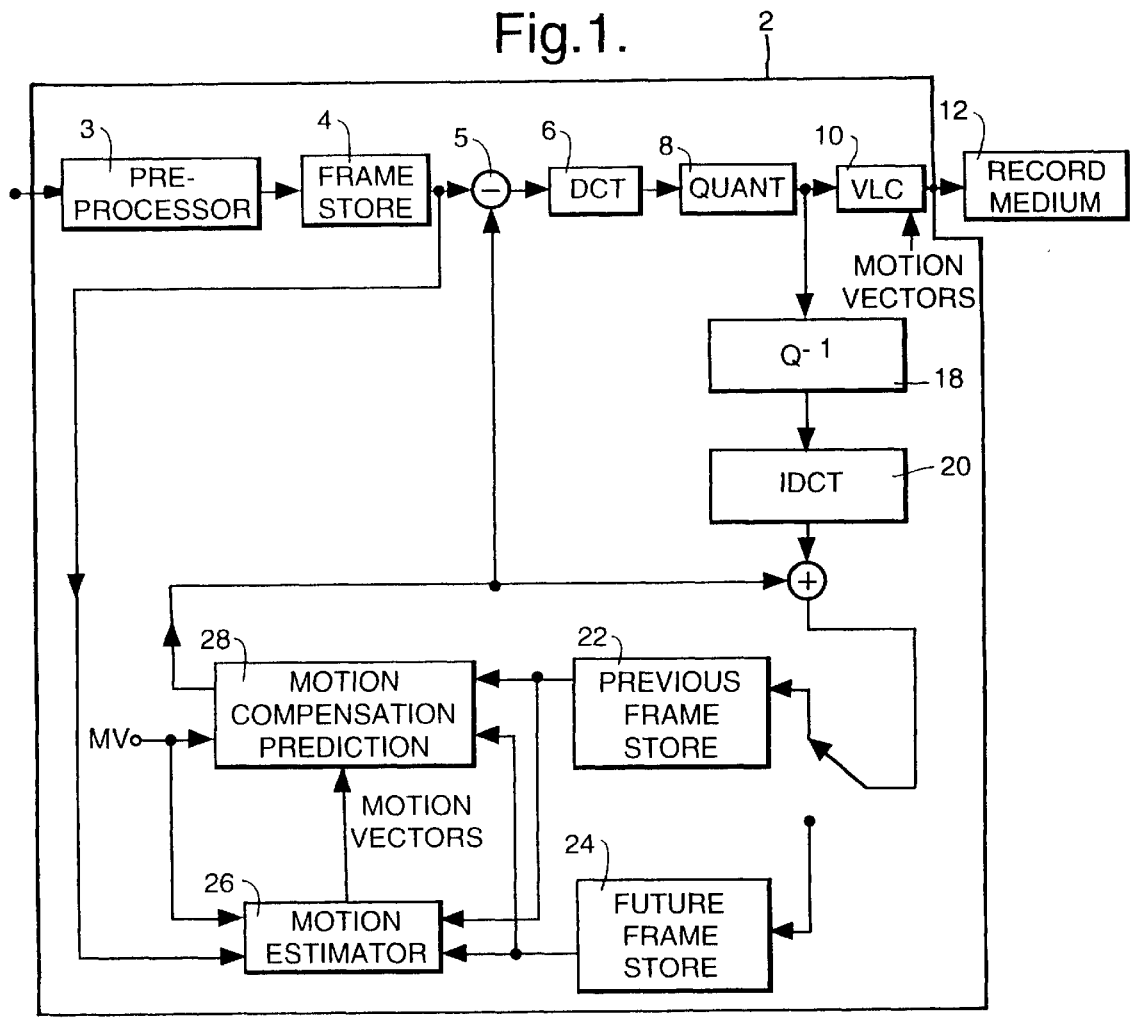
FIG. 1 shows a coder according to the invention.

FIG. 1 shows a coder 2 for coding a digital video signal according to the MPEG-1 standard. This standard relates to the coding of video at bit rates around 1.5 Mbit/s. The MPEG-1 standard features intrapictures and predicted pictures, which may be coded with reference to a preceding intrapicture or a preceding predicted picture. The MPEG-1 standard also features interpolated pictures which are coded with reference to a past and a future intrapicture or predicted picture.

The coder of FIG. 1 is intended to generate coded sequences representing three playback modes of the input video signal: play, fast forward and fast reverse. To generate a fast forward or reverse sequence at n times normal play speed, every nth frame of the input video is coded. Hence a fast forward speed that is 3 times normal play speed corresponds to every third input frame after the first being coded and, similarly, the reverse speed corresponds to every third input frame, in the reverse order, being coded.

A digital video signal representing a moving picture is input to a preprocessor 3 which selects the frames of the video signal which are to be coded. When the play sequence is to be generated, the preprocessor does not need to reorganise the input signal and thus the frames are passed directly to a current frame store 4. When a sequence other than the play sequence is to be generated, the preprocessor must select the frames to be coded. For instance, to generate a sequence representing a fast forward playback mode at three times the normal play mode, the preprocessor 3 outputs the first and every third frame thereafter to the current frame store 4. Similarly, when a reverse mode is to be coded, the preprocessor selects the relevant frames from the input video signal, when it is played in reverse.

The frames selected by the preprocessor 3 are input, frame by frame, to the current frame store 4 which stores a single input frame of the video signal. The first input frame of the video signal is coded as an intrapicture and thus is the only input to a subtracter S. The output of the subtracter S is input to a DCT transformer 6 which transforms the input data into DCT coefficients which are then quantised by a quantiser 8. The data then passes to a variable length coder (VLC) 10 which codes the data from the quantiser. The resulting coded data for the first frame is then stored on a record medium 12. Data from the quantiser 8 also passes to an inverse quantiser 18 and an inverse DCT 20 to reproduce the current frame of the input signal. This frame is stored in a previous frame store 22. A second frame store 24 stores subsequent frames which, together with the frame stored in the previous frame store 22, can be used to code a frame using bidirectional coding techniques, as is required in the MPEG-1 standard. Following frames of the input signal are coded using forward prediction, bidirectional prediction or intraframe techniques.

To generate a play sequence, every input frame is coded. For this purpose, as described above, the output of the inverse DCT 20 is stored in the previous frame store 22. On the input of a second frame to the current frame store 4, the contents of the previous frame store 22 and the current frame store 4 are input to a motion estimator 26 which calculates the motion vectors for the current frame. The motion vectors are input to a motion compensation predictor 28 together with the contents of the previous frame store 22 to produce a prediction of the current frame. This predicted frame is subtracted from the actual current frame of the input signal by the subtracter S and the resulting difference signal processed by the DCT 6 and the quantiser 8. The signal is then coded, as described above, by the VLC 10 which also multiplexes the coded difference signal with the motion vectors, quantisation parameters and inter/intra classification necessary for subsequent decoding. This coded data is then stored on the record medium 12.

The processing of the input video signal continues on a frame by frame basis until the whole video signal is coded. The record medium 12 will then contain a sequence of coded data representing the play mode of the video signal.

Figure 2:
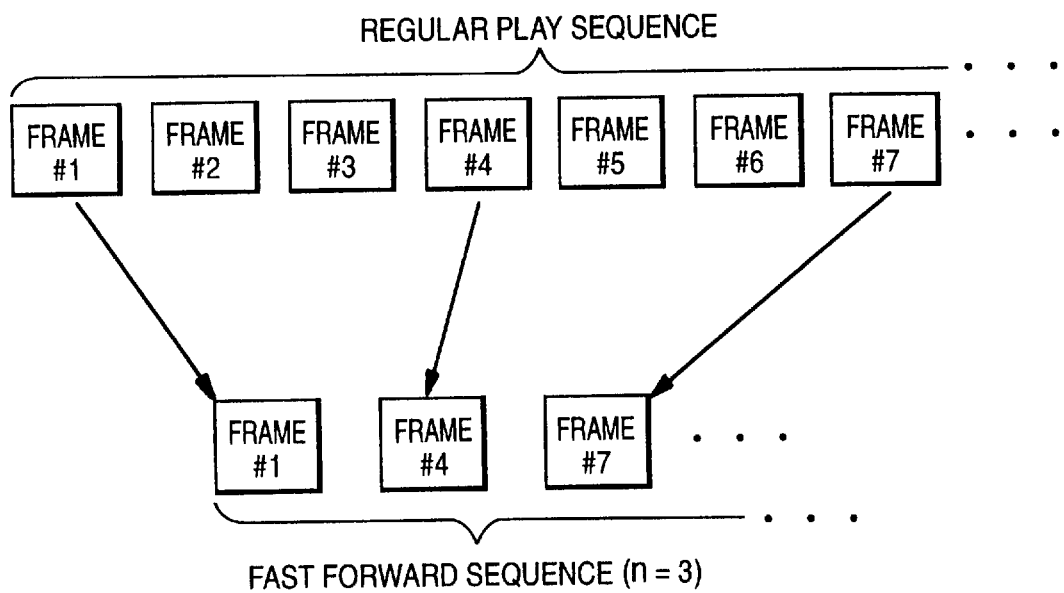
FIG. 2 is a schematic diagram indicating coded sequences produced by the coder of FIG. 1.

To generate a fast forward sequence at three times the normal play speed, every third input frame after the first frame is coded. When the fourth frame of the video signal is input to the current frame store 4 from the preprocessor 3, the predicted frame calculated from the contents of the previous frame store 22 (i.e the first frame) are subtracted by subtracter S from the actual fourth frame stored in current frame store 4. The difference signal produced is then processed by the DCT 6, the qualitiser 8 and the VLC 10 and stored on the record medium 12. This coding process continues for every third frame as schematically illustrated in FIG. 2.

Similarly, to generate a fast reverse sequence, every third frame of the reversed video signal is coded. This coded sequence is also stored on the record medium 12.

Hence three sequences of coded data are generated independently of each other: one representing the play mode, one representing the fast forward mode and one representing the fast reverse mode. All the sequences have the same constant average bit rate since they are encoded using the same technique.

Figure 3:
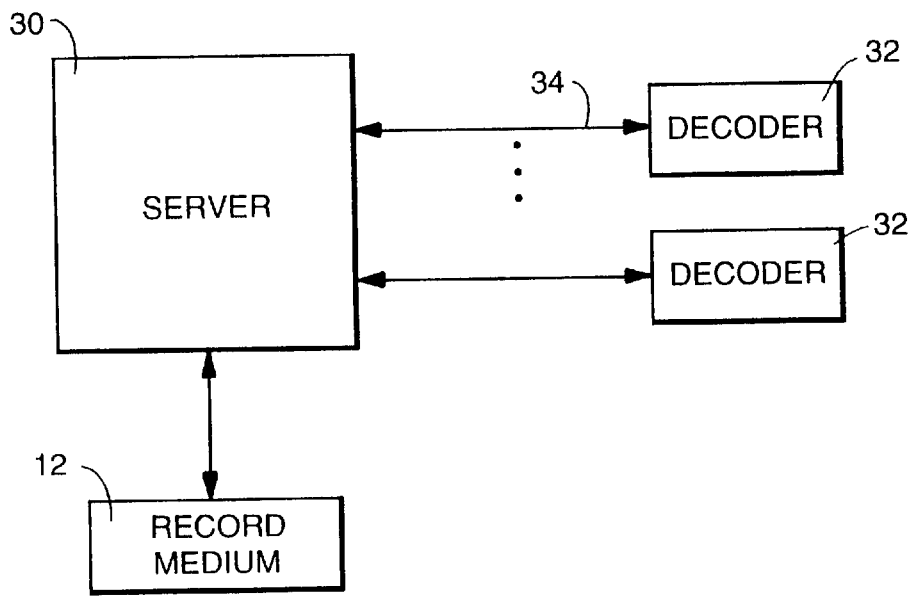
FIG. 3 shows an interactive video system according to the invention.

FIG. 3 shows a system for supplying video-on-demand. A server 30, for instance a mainframe computer, is connected to a number of remote decoders 32 located at consumers'premises via telecommunication links 34. The server 30 receives signals from the consumers and accesses a record medium 12 which stores coded sequences of data. On receipt of a signal from a consumer, the server accesses the relevant coded sequence and transmits the sequence to the consumer's decoder 32 via the link 34. The decoder 32 at the consumer's premises decodes the coded sequence and displays the resulting video signal on a television set.

If a consumer requests a playback mode, the server 30 is able to move from one sequence to the other without an unacceptable positioning error within the sequence owing to the constant average bit rate of the coded sequences. Interpolation from one sequence to another can be achieved using a pointer to the position within the sequence and the lengths of the particular sequence. That is to say:

$$pos_{fast\ forward} = pos_{play} \times length_{fast\ forward}/length_{play}$$

where:

pos=position within the sequence, in any suitable dimension e.g. time, bits etc.

length=length of sequence, in the same units as pos

Thus, if a consumer has viewed 75% of a film and requests fast forward, the server calculates the corresponding position in the fast forward sequence as follows:

$$pos_{fast\ forward} = 75 \times length_{fast\ forward}/100$$

i.e. the server accesses the fast forward sequence three quarters of the way through the sequence. When the consumer requests play mode, the server calculates the position reached within the fast forward sequence and calculates the corresponding position within the play sequence, as described above.

Similarly, the corresponding position within a fast reverse sequence can be calculated from the current position within the play sequence as follows:

$$pos_{reverse} = (length_{play} - pos_{play}) \times length_{reverse}/length_{play}$$

Whilst the above embodiment of the invention has been described with reference to a video-on-demand system, it should be appreciated that the invention may be employed in any other suitable interactive video system, for instance home shopping or entertainment services.

I claim:

1. A video replay apparatus comprising:

reproducing means for playing, a different playback modes of a moving picture, respective separately accessible sequential data files of digital signals recorded on a record medium;

switching means for switching between one of said sequential files being played and a further one of said sequential files, a position counter for recording a current position on a sequential file being displayed corresponding to a current position in a moving picture; and determining means, responsive, on switching by the switching means from a first sequential file being played to a second sequential file, to determine from the position counter and from information stored on the record medium a position on said second sequential file corresponding to the current position in the moving picture and to initiate playing by the reproducing means commencing from the determined position on said second sequential file.

2. A video replay apparatus as in claim 1 wherein:

the determining means, responsive to information stored on the record medium relating to lengths of said sequential files, calculates a proportion of the length of a sequential file being played that is represented by the current position in said sequential file being played and calculates a position in the other of said sequential files that corresponds to the same said proportion of its length.

3. A video replay apparatus as in claim 1 wherein:

the determining means, responsive to information stored on the record medium relating to lengths of said sequential files, calculates a remaining proportion of the length of a sequential file being played that is represented by the current position in said sequential file being played and calculates a corresponding position in the other of said sequential files.

4. A video replay apparatus as in claim 3 further including:

means for processing signals from at least one remote location, and means, responsive to a signal from a remote location, for accessing sequential files on the record medium and outputting such an accessed sequential file for transmission to the remote location.

5. A video replay apparatus as in claim 1 further including:

means for processing signals from at least one remote location, and means, responsive to a signal from a remote location, for accessing sequential files on the record medium and outputting such an accessed sequential file for transmission to the remote location.

6. A video replay apparatus according to claim 1, in which said determining means are also responsive, on switching by the switching means from the second sequential file being played to the first sequential file, to determine, from a current position on said second sequential file as recorded by the position counter corresponding to a current position in the moving picture and from information stored on the record medium, a position on said first sequential file corresponding to the current position in said moving picture.

7. A video replay apparatus as in claim 6 wherein:

the determining means, responsive to information stored on the record medium relating to lengths of said sequential files, calculates proportion of the length of a sequential file being played that is represented by the current position in said sequential file being played and calculates a position in the other of said sequential files that corresponds to the same said proportion of its length.

8. A video replay apparatus as in claim 6 wherein:

the determining means, responsive to information stored on the record medium relating to lengths of said sequential files, calculates a remaining proportion of the length of a sequential file being played that is represented by the current position in said sequential file being played and calculates a corresponding position in the other of said sequential files.

9. A video replay apparatus as in claim 6 further including:

means for processing signals from at least one remote location, and means, responsive to a signal from a remote location, for accessing sequential files on the record medium and outputting such an accessed sequential file for transmission to the remote location.

* * * * *